United States Patent [19]

Jelich

[11] Patent Number: 5,271,243
[45] Date of Patent: Dec. 21, 1993

[54] DEVICE FOR COOLING HOT GASES

[75] Inventor: Werner Jelich, Bochum, Fed. Rep. of Germany

[73] Assignee: Deutsche Babcock Energie- und Umwelttechnik AG, Oberhausen, Fed. Rep. of Germany

[21] Appl. No.: 967,182

[22] Filed: Oct. 27, 1992

[51] Int. Cl.$^5$ .......................... F28C 1/00; F28F 25/04
[52] U.S. Cl. ........................... 62/304; 62/311; 62/122; 261/127; 122/7 R
[58] Field of Search ............. 62/304, 311, 121, 122; 261/DIG. 9, DIG. 3, 127, 136, 138, DIG. 11; 122/7 R, 31.1, 31.2; 110/216, 217

[56] References Cited

U.S. PATENT DOCUMENTS

| 289,282 | 11/1883 | Leadley | 122/7 R |
| 2,175,469 | 10/1939 | Kaufman | 261/136 |
| 3,173,489 | 3/1965 | Okaniwa et al. | 261/DIG. 9 |
| 3,635,042 | 1/1972 | Spangemacher | 62/121 |
| 4,288,997 | 9/1981 | Friesen et al. | 62/434 |
| 4,351,275 | 9/1982 | Bhojwani et al. | 122/7 R |
| 4,377,132 | 3/1983 | Koog et al. | 122/7 R |
| 4,395,268 | 7/1983 | Zabelka | 122/7 R X |
| 4,599,952 | 7/1986 | Meier | 110/216 |

FOREIGN PATENT DOCUMENTS

| 40078 | 9/1973 | Australia | 62/304 |
| 1134687 | 4/1957 | France | 62/121 |

Primary Examiner—Henry A. Bennett
Assistant Examiner—William C. Doerrler
Attorney, Agent, or Firm—Max Fogiel

[57] ABSTRACT

A device for cooling hot gases deriving from incomplete oxidation in a reactor and loaded with solids. A pressurized vessel (2) accommodates a refrigerator (1) made of cooled pipe-slab walls at the top and a water bath (6) for quench cooling at the bottom. A gas outlet (8) extends out of the refrigerator (1). Another gas outlet (13) extends out of the bath. The outlets can be independently blocked. The vessel also accommodates a gas-collecting section (7) upstream of the first gas outlet (8) and another gas-collecting section (12) upstream of the second gas outlet (13).

16 Claims, 1 Drawing Sheet

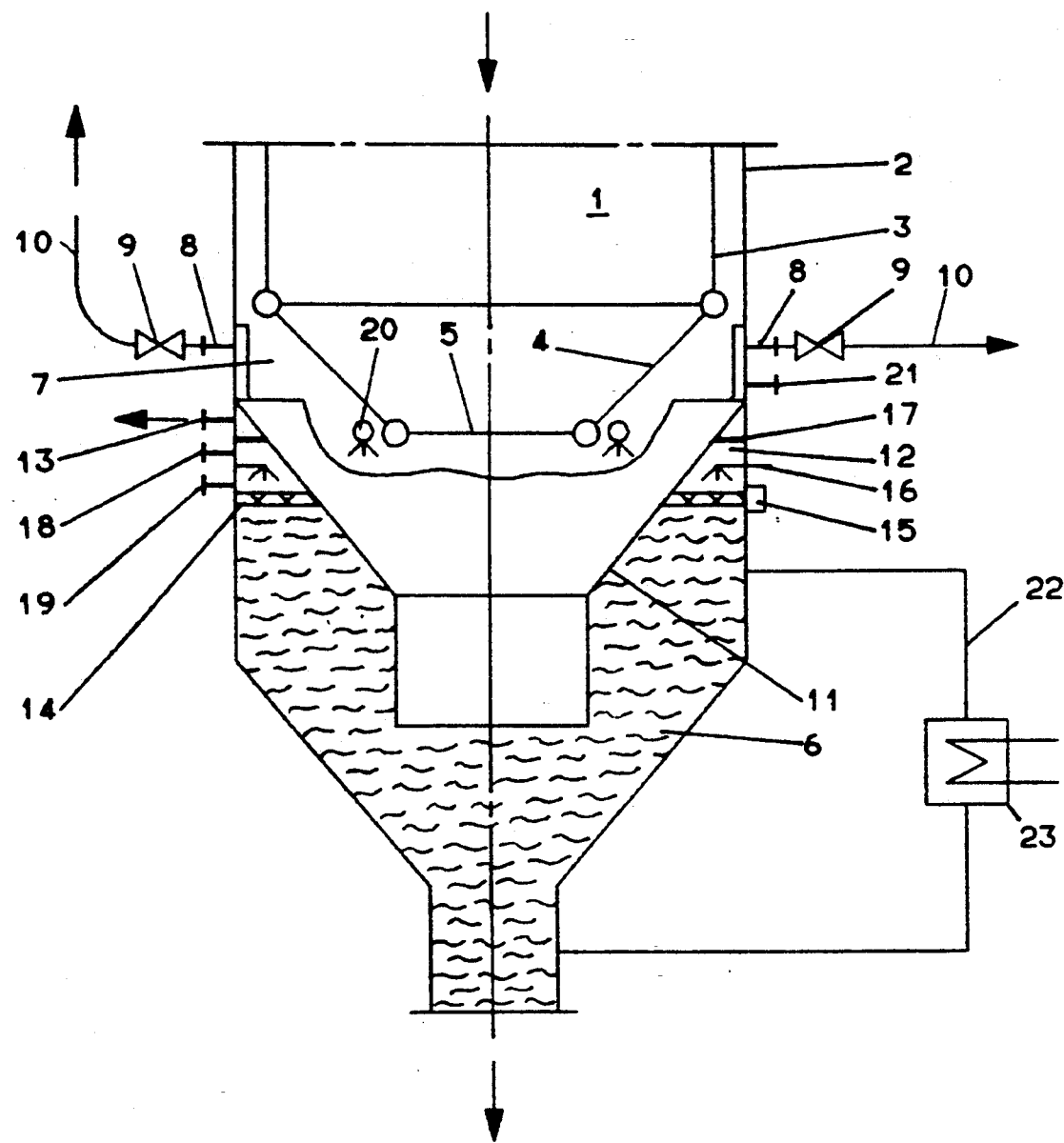

DEVICE FOR COOLING HOT GASES

BACKGROUND OF THE INVENTION

The invention concerns a device for cooling hot gases. The gases derive from incomplete oxidation in a reactor and are loaded with solids.

Contemporary fly-stream gasification methods are expected to gasify a multivalent range of fuels. This expectation, however, is considerably frustrated by downstream cooling processes that use a lot of energy. Heat-removal systems that efficiently exploit the apparent heat of the unprocessed gas for a specific range of fuels are known. These systems use either a refrigerator (German Patent 3 147 864) to achieve efficient heat utilization or a quencher (German Patent 2 940 933) to cool the unprocessed gas at least to some extent.

The refrigerator is accommodated in a container with a bath of water in the bottom. The bath intercepts and agglomerates tacky particles of ash entrained by the new gas. Another known device (German Patent 2 951 153) cools and cleans a synthesis gas derived from goal gasification. Some or all of the gas is forced through water and extracted through an outlet. The temperature of the gas, which is supplied to a downstream heat-removal boiler, varies extensively. The bath is as high as the gas outlet. The gas traveling through the bath picks up as intended the water it will need for chemical reactions during subsequent processing of the gas. It is, however, impossible to prevent the water from forming droplets within the unprocessed gas. Such droplets can cause malfunctions in the downstream equipment. There is a heat exchanger in the bath that regulates the water temperature to a considerable extent and prevents it from evaporating as the gas travels through it.

Fly-stream gasification is carried out at a high temperature, and necessarily utilizes, especially for the combination gas-and-steam turbine process, the unprocessed gas's apparent heat to generate the current. That heat accounts for approximately 20% of the power plant's efficiency. Gasification must completely convert as much of the carbon in the fuel as possible. The temperature of the gas leaving the gasification reactor will accordingly essentially depend on ash fluidics. The gas can accordingly enter the downstream heat-removal equipment at temperatures higher than 1800° C. Malfunctions in the downstream equipment can derive from the molten slag or, depending on how the process is conducted, from tacky particles entrained by the gas. To prevent such problems the unprocessed gas must be cooled down to approximately 700° to 1000° C., preferably in a refrigerator.

When some fuels, saliniferous brown coal for example, are employed, it is impossible to cool the gas further in a convective heat remover downstream of the refrigerator. Sublimates from the fuel would invade the unprocessed gas and could unacceptably contaminate the heating surfaces. In this event the gas can be cooled only with a quencher, preferably by immersion. Saliniferous brown coals have until now been successfully gasified only by fly streaming followed by immersion quenching.

SUMMARY OF THE INVENTION

The object of the invention is to improve the generic device to the extent that it will be appropriate for cooling gases deriving from gasification of a wide range of fuels.

The invention combines everything needed to cool unprocessed gases deriving from gasification of a wide range of fuels in a single cooler. The gases can be cooled preliminarily in a refrigerator, intermediately if necessary in a shower of water, and finally by immersing them in a quenching bath. Some or all of the unprocessed gas can then be extracted directly downstream of the refrigerator or, at least in the form of residue, the quenching bath.

Preferably cooled in the cooler in accordance with the invention are gases obtained by gasifying saliniferous brown coal. These gases cannot be cooled in a convection cooler downstream of the refrigerator. They are finally cooled accordingly by immersing them in water. A gas-collecting section makes it possible to separate drops of water and particles of dust from the gas leaving the bath.

The invention makes it possible to cool gases deriving from gasification of the widest possible range of fuels. The refrigerator is initially set for the first fuel to be handled. If other fuels follow and the temperatures to be decreased become too high for a refrigerator of that dimension, further cooling can be carried out below it, with a shower of water for example. Limiting the size of the refrigerator and providing additional cooling below it make it possible to reduce the overall size of the equipment. The invention eliminates a drawback of known refrigerators downstream of fly-stream gasification reactors. Such reactors have to be large because they consume so much energy cooling both the gas and the molten slag. Installation space and shipping capacities, however, dictate maximum reasonable dimensions. The refrigerator employed downstream of the fly-stream gasification stage in a 300 MW gas-and-steam power plant to cool the gas from 1600° to 800° C. for example can have an outside diameter of approximately 5.6 to 6.0 m and be 30.0 to 50.0 m long. This is at the threshold of economical construction. The invention, however, raises the threshold.

Finally, the invention makes it possible in the event of a malfunction on the part of downstream equipment in a multilineal plant to shut down the faulty line and route the excess gas through the water bath to cool it to the desired outgoing temperature.

BRIEF DESCRIPTION OF THE DRAWING

One embodiment of the invention will now be specified by way of example with reference to the drawing. The sole figure is a schematic longitudinal section through the bottom of a refrigerator with an integrated bath and shower.

DESCRIPTION OF THE PREFERRED EMBODIMENTS

An unillustrated reactor gasifies organic fuels by the fly-stream process. A refrigerator 1 is accommodated in a pressurized vessel 2 downstream of the reactor. The walls 3 of refrigerator 1 are slabs of pipe welded gas-tight and communicating with a steam-circulation system. Pipe-slab bulkheads can also extend into refrigerator 1. The bottom of the refrigerator is in the form of a constriction 4. The narrowest section of constriction 4 constitutes an outlet 5 for gas to leave refrigerator 1 through.

The bottom of pressurized vessel 2 accommodates a water bath 6 underneath refrigerator 1. The space between refrigerator 1 and bath 6 in pressurized vessel 2 functions as a gas-collecting section 7. Extending out of gas-collecting section 7 are one or more gas outlets 8. The unprocessed gas generated in the gasification reactor and cooled to some extent in refrigerator 1 is forced through bath 6 and leaves pressurized vessel 2 through gas outlets 8. Outlets 8 communicate through pipelines 10 with unillustrated equipment, convection coolers and scrubbers for example, that further process the gas. There are shut-off valves 9 in the immediate vicinity of the gas outlets 8 in pipelines 10. The shut-off valves are preferably sliding-gate valves.

Tacky particles of ash enter bath 6 and agglomerate. The agglomerated ash is sluiced out.

A hopper 11 is accommodated in and fastened gas-tight to pressurized vessel 2. Hopper 11 extends into bath 6. The space between hopper 11 and bath 6 in pressurized vessel 2 functions as another gas-collecting section 12. Extending out of second gas-collecting section 12 are several more gas outlets 13. Gas outlets 13 can be blocked, preferably with ball valves.

Hopper 11 is cooled by water in open contact with bath 6. The water arrives through a water intake 21 in the wall of pressurized vessel 2. The water enters at a temperature that prevents sublimation onto the surfaces in contact with the gas. A recirculation line 22 communicates with bath 6. Outside pressurized vessel 2, recirculation line 22 accommodates a heat exchanger 23 that is subjected to a coolant. The heat it absorbs in cooling the gas is removed from the water in heat exchanger 23.

When the pipelines 10 to first gas-collecting section 7 are blocked and the gas outlets 13 from second gas-collecting section 12 are open, the unprocessed gas leaving refrigerator 1 will flow through bath 6, where it will be quenched, and out through outlets 13. A mechanical dust precipitator 14 is accommodated above bath 6 in second gas-collecting section 12. Dust precipitator 14 is monitored by a pressure-difference gauge 15 and preferably rinsed out with water from a spray 16. Between dust precipitator 14 and gas outlets 13 is a water-droplet precipitator 17. This system ensures that no dust, aerosol, etc. will be present to cause problems in the line to the downstream scrubber.

Second gas-collecting section 12 has an intake 18 for a barrier atmosphere, an air outlet 19, and a water-level gauge. When the gas is not to be quenched in bath 6 and when the gas outlets 13 from second gas-collecting section 12 are accordingly closed, the barrier atmosphere will increase the pressure in the gas-collecting section until it is higher than that of the gas in first gas-collecting section 7. The gas will accordingly be kept out of bath 6.

Accommodated in first gas-collecting section 7 is a shower ring 20. Ring 20 is supplied with water from the circulation system. The ring sprays the gas leaving refrigerator 1 and lowers its temperature even further before it leaves through gas outlets 13. The sublimation point of most known fuels is between 180° and 200° C. The steam in gases obtained by fly-stream gasification in gas-and-steam plants condenses at 120° to 160° C. We now know that the way to purify gases from a gas-and-steam plant once they have been cooled is to scrub them. They are usually scrubbed at a temperature above the sublimation point of the unprocessed gas. The result is enough of a difference between the steam-condensation point and the temperature at which the gas enters the scrubber for the aforesaid gas cooler to further cool the gas by spraying it with water. The shower is adjusted to ensure that the evaporating water can cool the gas enough for it to travel uneventfully through the downstream equipment while the steam-condensation point is below the temperature of the gas entering the scrubber.

I claim:

1. An arrangement for cooling hot gases produced from incomplete oxidation in a reactor and laden with solids, comprising: a pressurized vessel with a top and bottom; refrigerating means in said vessel and having cooled pipe-slab walls at said top; a water bath for quench cooling at said bottom; a first gas outlet extending out of said refrigerating means; a second gas outlet extending out of said bath; means for blocking independently each of said gas outlets; a first gas-collecting section inside said vessel and upstream of said first gas outlet; a second gas-collecting section inside said vessel upstream of said second gas outlet; hopper means extending into said bath, said second gas-collecting section being formed by said hopper means and said bath.

2. An arrangement for cooling hot gases produced from incomplete oxidation in a reactor and laden with solids, comprising: a pressurized vessel with a top and bottom; refrigerating means in said vessel and having cooled pipe-slab walls at said top; a water bath for quench cooling at said bottom; a first gas outlet extending out of said refrigerating means; a second gas outlet extending out of said bath; means for blocking independently each of said gas outlets; a first gas-collecting section inside said vessel and upstream of said first gas outlet; a second gas-collecting section inside said vessel upstream of said second gas outlet; hopper means extending into said bath, said second gas-collecting section being formed by said hopper means and said bath; said second gas collecting section having an air outlet being chargeable with a barrier atmosphere, said second gas collecting section having monitored gas pressure and water level.

3. An arrangement as defined in claim 1, including a water intake and a water recirculation line connected to said bath; a heat exchanger with a coolant in a section of said recirculation line outside said vessel.

4. An arrangement as defined in claim 1, wherein gas flow out of said refrigerating means an said bath is blockable directly by said gas outlets.

5. An arrangement as defined in claim 1, including nozzle means in said first gas-collecting section for spraying water into gas being cooled.

6. An arrangement as defined in claim 1, including a water intake connected to said bath; said hopper means being cooled by water circulating in open contact with said water intake and terminating in said bath.

7. An arrangement as defined in claim 1, including a mechanical dust precipitator and a water-droplet precipitator above said bath in said second gas collecting section.

8. An arrangement as defined in claim 7, including a pressure-difference gauge for monitoring said dust precipitator, said dust precipitator being rinsed with water.

9. An arrangement for cooling hot gases produced from partial oxidation in a reactor and laden with solids, comprising: a radiation cooler and quench cooling means with a water bath; a vessel with a bottom and holding said radiation cooler, said cooler having cooled pipe walls; said water bath being located below said radiation cooler in said bottom of said vessel; a first gas outlet connected to said radiation cooler; a second gas outlet connected to said water bath; a first gas-collecting chamber communicating with said first gas outlet inside said vessel and associated with said radiation cooler; a second gas-collecting chamber communicating with said second gas outlet inside said vessel and associated with said water bath; hopper means extending into said water bath and having an upper rim and a lower open end; said vessel having an inner wall, said upper rim being gas-tight connected with said inner wall of said vessel; said second gas-collecting chamber being bordered by said inner wall of said vessel, said hopper means and said water bath, said second gas-collecting chamber being separated from said first gas-collecting chamber by said hopper means and said water bath; and means for blocking independently each of said gas outlets.

10. An arrangement as defined in claim 9, including a water intake and a water recirculation line connected to said bath; a heat exchanger with a coolant in a section of said recirculation line outside said vessel.

11. An arrangement as defined in claim 9, wherein said gas flow out of said radiation cooler and said bath is blockable directly by said gas outlets.

12. An arrangement as defined in claim 9, including nozzle means in said first gas-collecting chamber for spraying water into gas being cooled.

13. An arrangement as defined in claim 9, including a water intake connected to said bath; said hopper means being cooled by water circulating in open contact with said water intake and terminating in said bath.

14. An arrangement as defined in claim 9, including a mechanical dust precipitator and a water-droplet precipitator above said bath in said second gas collecting chamber.

15. An arrangement as defined in claim 14, including a pressure-difference gauge for monitoring said dust precipitator, said dust precipitator being rinsed with water.

16. An arrangement as defined in claim 9, wherein said second gas collecting chamber has an air outlet and is chargeable with a barrier atmosphere, said second gas collecting chamber having a monitored gas pressure and water level.

* * * * *